US005150461A

United States Patent [19]

Reynolds

[11] Patent Number: 5,150,461

[45] Date of Patent: Sep. 22, 1992

[54] FIXED POINT METHOD OF VIDEO DISPLAY SCALING

[75] Inventor: Neal S. Reynolds, Schaumburg, Ill.

[73] Assignee: Sun Electric Corporation, Crystal Lake, Ill.

[21] Appl. No.: 198,226

[22] Filed: May 25, 1988

[51] Int. Cl.[5] .............................................. G06F 15/66

[52] U.S. Cl. .................................... 395/164; 340/750; 382/47

[58] Field of Search ....................... 364/521, 522, 518; 382/47; 340/728, 731, 723, 750; 395/162, 164

[56] References Cited

U.S. PATENT DOCUMENTS

| | | | |
|---|---|---|---|
| 4,460,890 | 7/1984 | Busby | 364/723 |
| 4,712,185 | 12/1987 | Aoki | 364/518 |
| 4,718,024 | 1/1988 | Guttag et al. | 364/518 |
| 4,742,553 | 5/1988 | Irwin | 382/47 |
| 4,747,154 | 5/1988 | Suzuki et al. | 382/47 |
| 4,752,891 | 6/1988 | Van Daele | 364/518 |
| 4,763,279 | 8/1988 | Kellam et al. | 364/518 |

*Primary Examiner*—Gary V. Harcom
*Assistant Examiner*—Phu K. Nguyen
*Attorney, Agent, or Firm*—Nicholas A. Camasto

[57] ABSTRACT

A method of scaling data between memories of different horizontal sizes by calculating an increment expressed as an integer and a fraction relating the horizontal memory sizes, multiplying the fraction by the dynamic range of a fraction portion counter, and successively adding the integer portion in an integer portion counter and the fraction portion in the fraction portion counter, with a carry to the integer portion counter when the fraction portion counter overflows. The corresponding points in the memories are selected based upon the total count in the integer portion counter.

5 Claims, 3 Drawing Sheets

$$\frac{\text{BUFFER POINTS}}{\text{MEMORY DOTS}} = \frac{1000}{640} = 1.56250$$

INTEGER = 1.0

FRACTION = .56250 x 65536 = 36864

FIXED POINT METHOD OF VIDEO DISPLAY SCALING

CROSS REFERENCE TO RELATED RELATED PATENT APPLICATIONS

This application is related to, but not dependent upon, co-pending application Ser. No. 148,973, filed Jan. 27, 1988, now U.S. Pat. No. 4,807,176 entitled Flag Generation System, in the names of K. Bahnick and J. Johnson; Ser. No. 148,972, filed Jan. 27, 1988, now U.S. Pat. No. 4,903,219, entitled Flag Identification System, in the names of N. Reynolds, R. Woodbury and R. Rzadzki; Ser. No. 148,974, filed Jan. 27, 1988, now U.S. Pat. No. 4,903,220, entitled Dual Ported Speed Up Memory, in the name of J. Johnson; Ser. No. 198,305, filed May 25, 1988, now abandoned, entitled EGA VIDEO Bit Plane Processing, in the name of N. Reynolds, and Ser. No. 198,225, filed May 25, 1988, now abandoned, entitled Simulated Overlay Display System, in the name of N. Reynolds; all of which applications are incorporated by reference herein and all of which applications are assigned to Sun Electric Corporation.

BACKGROUND OF THE INVENTION AND PRIOR ART

This invention relates generally to computer based automotive diagnostic test equipment and specifically to a technique for rapidly scaling digital data to a fixed pixel display memory to simulate an analog "scope" function.

The prior art discloses automobile engine diagnostic testing devices that are computer based. One diagnostic tester, identified as the Sun Electric Corporation Model 2001, is described and claimed in U.S. Pat. No. 4,125,894 issued Nov. 14, 1978, which is incorporated by reference herein. With that tester, selected analog signals are gathered from an engine under test by means of one or more suitable probes connected to the engine. The received analog signals are conditioned, manipulated, processed and compared with factory specifications for the engine. The data is also displayed on a raster scan cathode type ray tube (CRT) display and a printout of test results is also provided. A recently introduced computerized diagnostic tester that is IBM PC compatible is the Sun Electric Corporation Model MCA 3000. The MCA 3000 is capable of receiving and processing engine test signals at significantly higher speeds than prior art testers, primarily due to its data acquistion system (DAS). With the DAS, analog data and test signals obtained from an engine under test are converted by an analog to digital (A/D) converter, flagged and stored in a random access memory (RAM) without the intervention of the main system microprocessor or its address/data bus.

In co-pending application Ser. No. 148,973, now U.S. Pat. No. 4,907,176, a system for generating identification flags for signals, acquired from an engine under test and converted by an A/D converter, to permit their storage in a RAM memory in a retrievable manner is disclosed and claimed. The flags identify the beginning of an event such as a cylinder firing, a cylinder No. 1 firing, a solenoid dwell cycle and the like. The flag bits selected are more significant than any of the magnitude bits used in the digital words. For example, in a sixteen bit digital word having bits (D0–D15), eleven bits (D0–D10) are used for magnitude, one bit (D15) is for the sign of the quantity, i.e. positive or negative magnitude, and four bits (D11–D14) are utilized for flags. In the flag system, bit D15 is made equal to the sign bit D11. This is referred to as sign extended 2's complement notation. The flags enable identification of the digital words in the A/D RAM memory and facilitate efficient utilization of that data.

In co-pending application Ser. No. 148,972, now U.S. Pat. No. 4,903,219, a parity checking routine that is resident in the system microprocessor is run to identify flags in the digital words in the A/D memory. Bit masking techniques are used to find and to reset the flags when returning the data to memory. Information about the location of different types of flags is stored in pointer arrays established in the system memory by the system microprocessor controller.

In co-pending application Ser. No. 148,974, now U.S. Pat. No. 4,903,220, an external dual ported 128 kilobyte RAM memory is plugged into a ROM cartridge slot in an IBM compatible PC system. The RAM memory can be written to by the DAS system as well as accessed by the system microprocessor controller. Dual porting is obtained by using a conventional single ported RAM in conjunction with a pair of buffers to control access to the RAM from the DAS system and from the system microprocessor. The added RAM memory enables the DAS system to operate substantially independently of the system microprocessor in acquiring, converting to digital format, and flagging of engine test signals. Thus the system's microprocessor need not be burdened with the task of engine test data acquisition and overall system speed is significantly increased.

Co-pending application Ser. No. 198,305, now abandoned, discloses a method of using an EGA (Enhanced Graphics Adapter) board in its bit plane mode for performing high speed oscilloscope functions. With the technique, a single bit in any of the four bit planes may be set or cleared without disturbing the data in other planes. With it, the MCA 3000 software can generate a rapidly updated trace against a graticule and with highlight and label data, with the trace updating approaching real time.

Co-pending application Ser. No. 198,225, now abandoned, discloses a method of operating a color bit plane memory to create the illusion of four independent overlying color planes. A hierarchy is established among the planes and color plane bit groups are mapped to color display groups based upon the hierarchy. The method precludes color changes wherever the patterns in the different planes intersect or overlap.

The present invention is concerned with the method of taking flagged data from DAS memory and loading it into a display memory of fixed size. The A/D converter of the MCA 3000 operates at a fixed frequency and collects 62,500 data samples per second, which is one sample every 16 microseconds. The data has a resolution of 12 bits but, as mentioned, 16 bit digital words are used. Since the test engines operate at varying speeds, the number of samples collected by the A/D converter varies over a substantial range. In order to produce an analog type scope display with digital display memories and techniques, a method of scaling the received data to the display memory size is needed. There are techniques in the prior art for accomplishing this, which either adjust the A/D sampling rate in accordance with engine speed to gather a fixed number of samples to fit the display memory, or which use complex hardware for scaling the data. It will be appreciated that scaling the magnitude of the data presents a much lesser problem than scaling the number of received data sample points. While the present invention is software based, it does not suffer the disadvantage of most software systems in that it is extremely fast operating. In essence, the method of the invention determines the number of samples in the data and calculates an "increment" that relates the number of samples in the data to the number of points or pixels in the memory. A processing technique, which is denominated "fixed point processing", is used to rapidly scale the data samples by very fast and simple instructions.

OBJECTS OF THE INVENTION

A principal object of the invention is to provide a novel method for scaling data.

Another object of the invention is to provide a method of scaling data of variable numbers of sample points to a video display of a fixed number of pixels.

BRIEF DESCRIPTION OF THE DRAWINGS

These and other objects of the invention will be apparent upon reading the following description in conjunction with the drawings in which.

DESCRIPTION OF THE PREFERRED EMBODIMENT

Figure 1:
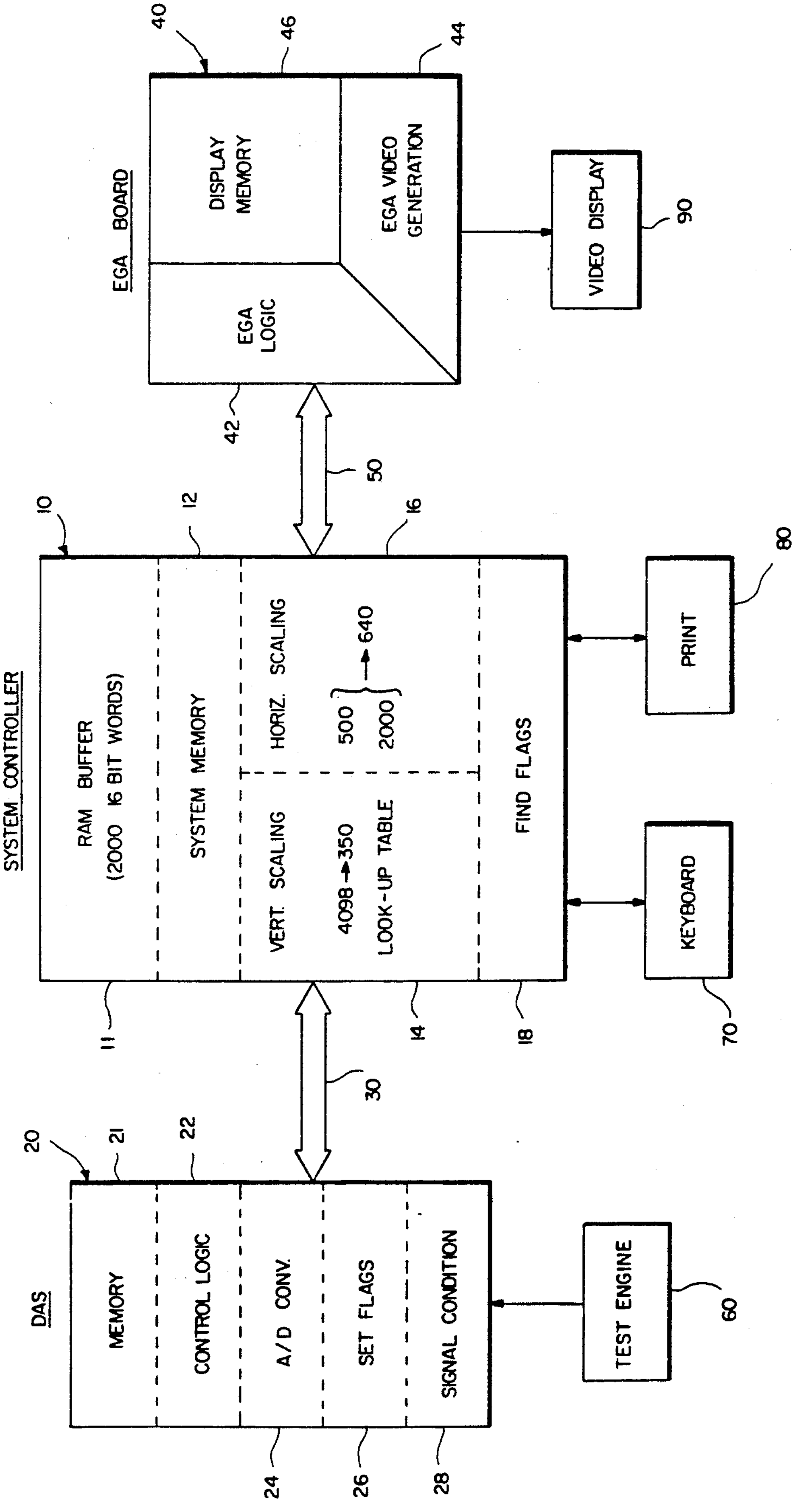
FIG. 1 is a simplified block diagram of engine diagnostic computer for practicing the method of the invention.

Referring to FIG. 1, a system controller is generally designated by reference number 10. System controller 10 may comprise an IBM compatible PC and includes a RAM buffer 11 that is part of a system memory 12. The software in system controller 10 also supports a Vertical Scaling routine indicated as 14, a Horizontal Scaling routine indicated as 16 and a Find Flags routine indicated as 18. It will be appreciated that this representation of the software routines is for illustrative purposes only. System controller 10 is coupled to a DAS system 20 via a bi-directional communications bus 30. DAS system 20 includes a memory 21, control logic 22, an A/D converter 24, a Set Flags routine 26 and Signal Conditioning apparatus 28. System controller 10 is also coupled to an EGA board, generally designated by reference numeral 40, via a bi-directional communications bus 50. The EGA board includes an EGA logic section 42, an EGA video generation section 44 and a display memory 46. A video display 90 is coupled to EGA video generation section 44. An engine under test, generally designated as 60, is coupled to DAS 20 and provides analog signals thereto. System controller 10 may also be coupled to a keyboard 70 and to a printer 80.

As indicated, RAM buffer 11 in system controller 10 has a size of 2000 sixteen bit words. The horizontal size of the RAM buffer is chosen to be sufficiently large to accept a "cylinder's worth of data" when the test engine is run at the lowest test speed, based upon the fixed sampling rate of the A/D converter (slow speeds yield more samples per cylinder firing event). Vertical Scaling routine 14 indicates a 4098 to 350 lookup table and Horizontal Scaling routine 16 indicates from 500-2000 points to 640. It should be noted that the size of the display memory is determined by the number of pixels. In practice some pixels are reserved for alphanumerics and the like and the actual number of "active" horizontal points may be closer to 560. However the actual number is of no importance to the invention.

As will be recalled, the DAS gathers an engine data sample every 16 microseconds. Each 12 bit sample is stored in a 16 bit word with the upper 4 bits being used for flags and a sign bit as described in the co-pending applications. With the flagged words, the software can quickly scan the DAS memory and determine the start and end of the data for each cylinder. The amount of data gathered (number of sample points) is dependent upon engine speed. The 12 bit magnitude data has a dynamic range of −2048 to +2047 which must be converted to a line number on the CRT screen and in display memory to properly represent the voltage magnitude corresponds to each DAS sample. This is done by vertically scaling the data and is a fairly straightforward operation. By far the greater problem results from the fact that the number of samples gathered is invariably greater than, or less than, the available display memory and, if anything close to real time updating is desired, a rapid system for horizontal scaling is required.

Vertical scaling is conventionally accomplished with a 4096 word long lookup table which translates or converts the digital magnitudes to line numbers. Since the vertical scale on the CRT display is changed very infrequently (only when the range or the zero line is changed), the lookup table could readily be constructed in "C" language using full floating point computer code. As those skilled in the art are aware, full floating point computations are, relatively speaking, very slow. Because of the infrequent vertical updating however, such computations would suffice. To scale each point as it comes in with a "multiply" and an "add" instruction would take a relatively long time and result in a much slower waveform update rate. While suitable for vertical data, it is useless for updating horizontal data if an analog type scope display is to be simulated. In the preferred embodiment of the invention, a "fixed point" technique (to be described) is used to generate the vertical lookup table. The "fixed point" technique uses assembly code that executes very quickly. This code is used because of the very simple and highly repetitive nature of the operations in "fixed point" processing.

Figure 2:
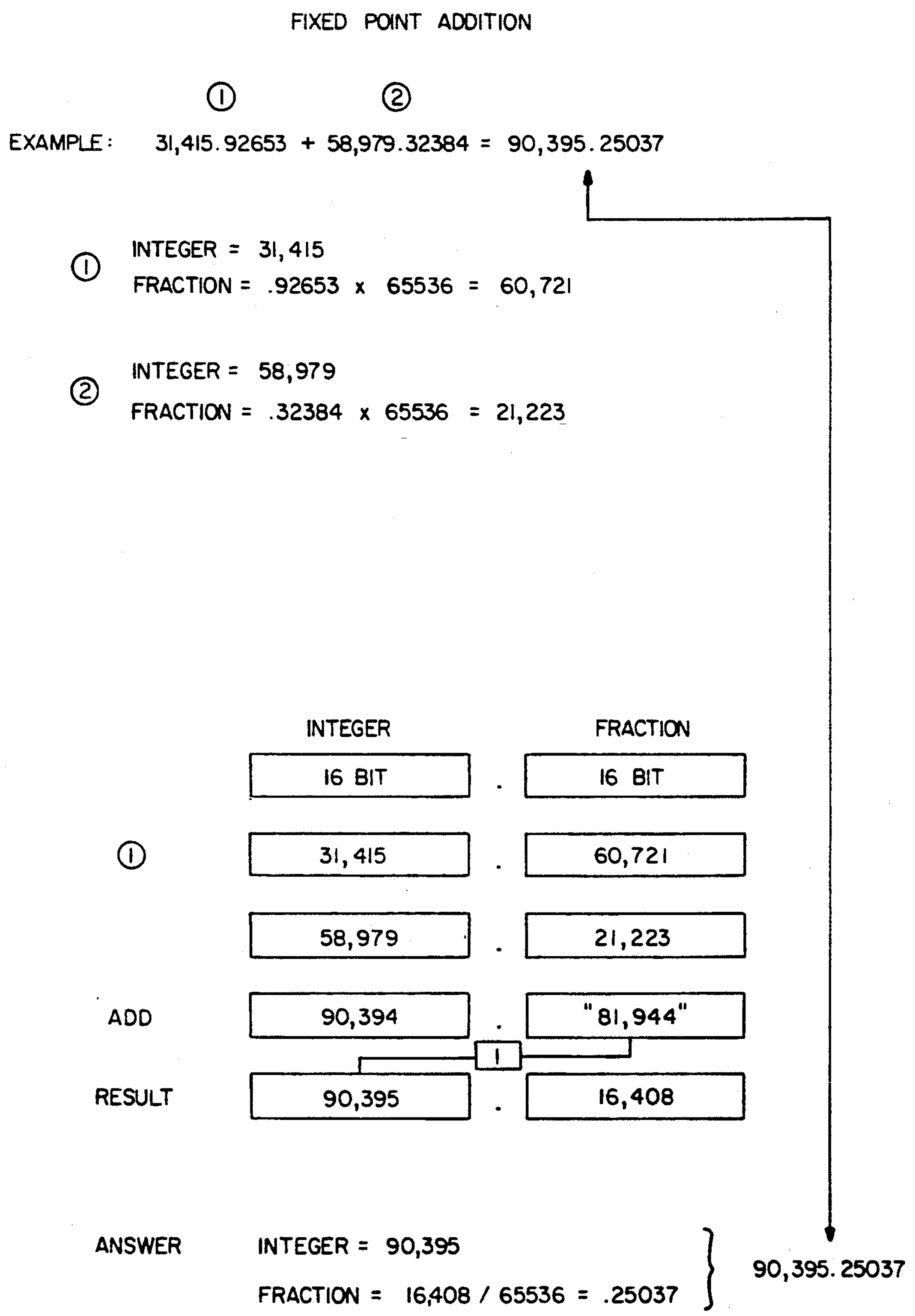
FIG. 2 is a example of a fixed point addition used in the method of the invention.

In FIG. 2, an example of "fixed point" addition is shown. Two numbers, each having large integers and large decimal portions and their arithmetic sum, using floating point addition are shown. In "fixed point" processing the numbers are separated into integer portions and fraction portions. The fraction portions are multiplied by another number that represents the dynamic range of the counter that is to be used. In the present example, 16 bit counters are used and the dynamic range of the counter is therefore decimal 65,536. In adding numbers with "fixed point" addition, the integer portions and the modified fraction portions are added separately with a carry occurring when the dynamic range of the fraction counter is reached, i.e. when the counter overflows. As shown in FIG. 2, the answers are identical whether using full floating point addition or "fixed point" addition.

Figure 3:
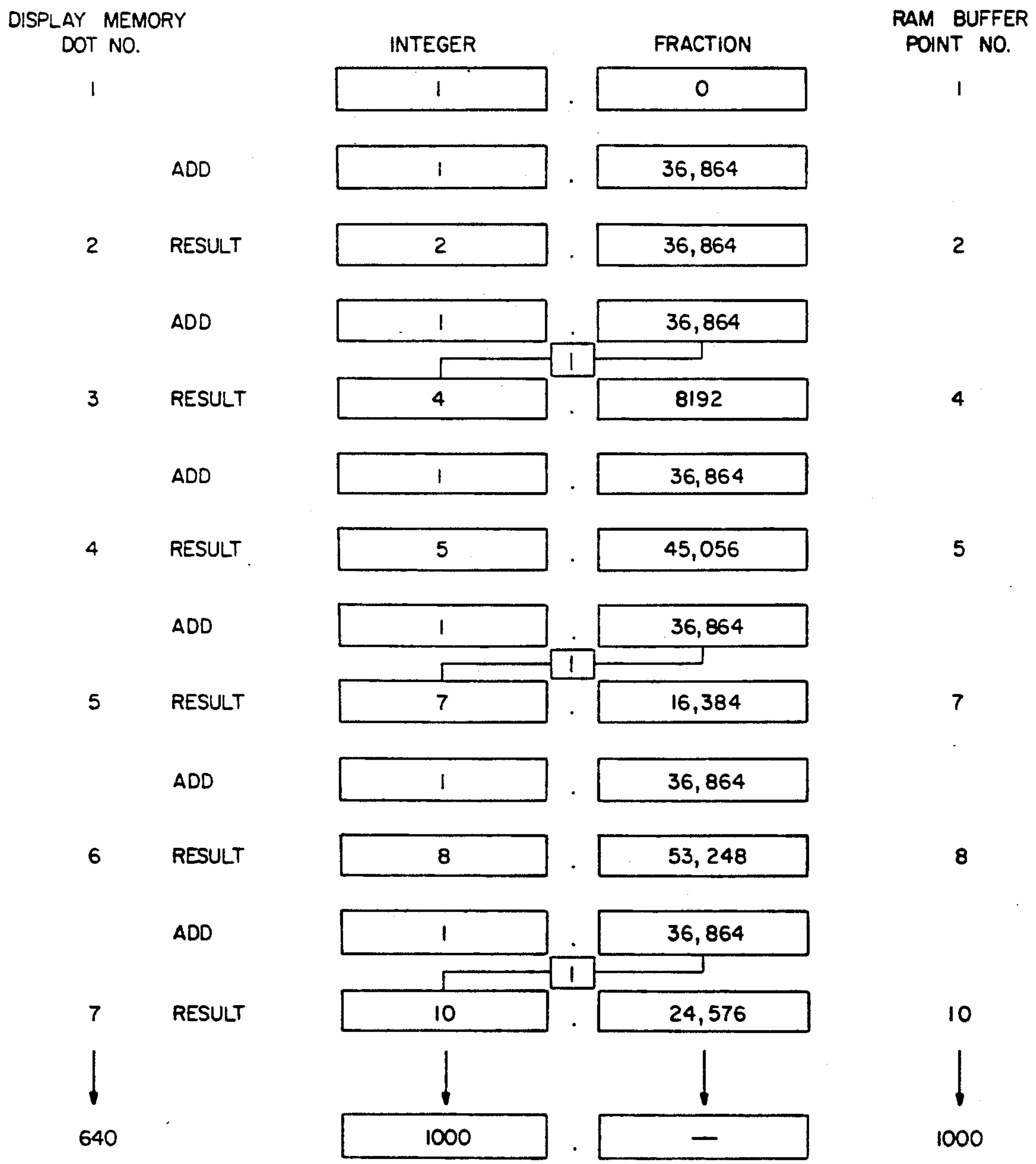
FIG. 3 is a partial illustration of use of the inventive method to scale data between a display memory and a buffer memory.

FIG. 3 is an example of how the "fixed point" technique may be used to scale the buffer sample points to the display memory points or dots. In the example chosen, the number of sample points in the RAM buffer is assumed to be 1000 and the number of dots in the display memory is assumed to be 640, yielding a quotient of 1.56250. The integer portion is 1.0 and the fraction portion is 0.56250, which when multiplied by 65,536, equals 36,864. Thus the "increment" that is to be successively added to the counter is "1.36864", i.e. 1 and 36864/65536.

Commencing with the display memory dot No. 1, the integer portion counter is set to 1 and the fraction portion counter is set to 0 and the RAM buffer corresponding point number is 1. The first increment is added with a 1 being added to the integer portion counter and 36,864 being added to the fraction portion counter and the result taken. For display dot 2 the integer portion counter reads 2 and the fraction portion counter reads 36,864. The RAM buffer point number is selected by reference only to the integer portion counter, with the fraction counter being ignored except for the carry function. Thus memory display dots 1 and 2 correspond to RAM buffer sample points numbers 1 and 2. At the addition of the next increment of 1 and 36,864, the fraction portion counter overflows and a carry 1 is added to the integer portion counter. The integer portion counter for memory display dot No. 3 therefore reads 4 and RAM buffer point No. 4 is selected. The remainder in the fraction portion counter is now 8192. A further increment results in memory display dot No. 4 corresponding to RAM buffer point No. 5. A successive increment addition results in a carry in the fraction portion counter and display dot No. 5 corresponding to RAM buffer point No. 7. This process is repeated for all of the display memory dots and RAM buffer sample points, resulting in the data in the RAM buffer being scaled to fit into the display memory.

The only relatively slow step in the above technique is the initial one where the fraction portion is calculated. Thereafter a simple addition of the increment to a running counter for each dot is all that is required to scale the data. The routine is extremely fast and the trace on the CRT screen is updated at a speed that is very close to real time. It will be appreciated that as the engine speed varies, the increment needs to be recalculated and this is done for each cylinder's data.

It will also be noted that the size of the fraction portion is dictated by the dynamic range of the counter used. A counter of lesser bits will yield less resolution. Other modifications in the described method of the invention will be apparent to those skilled in the art. The invention is to be limited only as defined in the claims.

What is claimed is:

1. A high speed software method of operating a video display having a fixed number of pixels for displaying data having a different number of points, comprising the steps of:

calculating an increment, expressed as an integer portion and a fraction portion, that relates the number of pixels to the number of data points;

multiplying the fraction portion by the dynamic range of a counter;

successively combining the integer portions and fraction portions separately in counters and providing a carry to the integer portion counter when the counter for the fraction portion overflows; and correlating pixels and points based upon the total count in the integer portion counter.

2. The method of claim 1 wherein said data has a maximum amplitude and said video display has a given number of vertical lines, and further comprising the steps of:

generating a lookup table correlating the amplitude of said data with said given number of vertical lines; and translating said data by referral to said lookup table for selecting pixels in the video display.

3. The method of claim 2 wherein said lookup table is created by repeating the steps of claim 1 with another increment correlating the number of vertical lines with the magnitude of the data.

4. The method of claim 3 wherein there is provided a data memory for storing said data points, a RAM buffer under control of a microprocessor and a video display memory for storing pixel information and wherein said data is translated by said lookup table and horizontally scaled as it is supplied to the RAM buffer.

5. A method of inputting data to a video display memory, having a fixed number of vertical and horizontal pixels, from a memory comprising a variable number of horizontal data points within a given amplitude range, comprising the steps of:

providing a RAM buffer;

scaling the data from said memory to fit the number of vertical pixels of the display memory;

loading the scaled data into the RAM buffer;

calculating an increment, expressed as an integer portion and a fraction portion relating the number of horizontal pixels in the display memory to the number of horizontal data points in the RAM buffer;

multiplying the fraction portion by the dynamic range of a fraction portion counter;

successively and separately combining the integer portions in an integer portion counter and the fraction portions in the fraction portion counter and providing a carry to the integer portion counter when the fraction portion counter overflows; and selecting corresponding data points in the RAM buffer and the display memory based upon the total count in the integer portion counter.

* * * * *